(12) United States Patent
Thuilliez et al.

(10) Patent No.: US 10,189,978 B2
(45) Date of Patent: Jan. 29, 2019

(54) RUBBER COMPOSITION COMPRISING A HIGHLY SATURATED DIENE ELASTOMER

(71) Applicants: COMPAGNIE GENERALE DES ETABLISSEMENTS MICHELIN, Clermont-Ferrand (FR); Michelin Recherche et Technique S.A., Granges-Paccot (FR)

(72) Inventors: Julien Thuilliez, Clermont-Ferrand (FR); Benoit Schnell, Clermont-Ferrand (FR); Julien Cladiere, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 370 days.

(21) Appl. No.: 14/762,327

(22) PCT Filed: Jan. 21, 2014

(86) PCT No.: PCT/EP2014/051068
§ 371 (c)(1),
(2) Date: Jul. 21, 2015

(87) PCT Pub. No.: WO2014/114607
PCT Pub. Date: Jul. 31, 2014

(65) Prior Publication Data
US 2015/0353716 A1  Dec. 10, 2015

(30) Foreign Application Priority Data

Jan. 22, 2013  (FR) ..................................... 13 50557

(51) Int. Cl.
 C08L 23/00 (2006.01)
 C08L 23/08 (2006.01)
 B60C 1/00 (2006.01)
 C08L 9/06 (2006.01)
 C08F 236/10 (2006.01)

(52) U.S. Cl.
 CPC .......... C08L 23/083 (2013.01); B60C 1/0016 (2013.01); C08L 9/06 (2013.01); C08F 236/10 (2013.01); C08L 2205/02 (2013.01)

(58) Field of Classification Search
CPC .................................................... C08L 23/083
See application file for complete search history.

(56) References Cited

U.S. PATENT DOCUMENTS

| 6,569,799 | B1 | 5/2003 | Barbotin et al. ............. 502/152 |
| 6,610,261 | B1 | 8/2003 | Custodero et al. ........... 423/127 |
| 6,747,087 | B2 | 6/2004 | Custodero et al. ........... 524/497 |
| 6,800,705 | B2 | 10/2004 | Barbotin et al. ............. 526/127 |
| 7,094,854 | B2 | 8/2006 | Monteil et al. .............. 526/339 |
| 7,199,175 | B2 | 4/2007 | Vasseur ....................... 524/492 |
| 7,547,654 | B2 | 6/2009 | Boisson et al. .............. 502/152 |
| 7,820,771 | B2 | 10/2010 | Lapra et al. .................. 525/479 |
| 7,825,183 | B2 | 11/2010 | Robert et al. ................ 524/476 |
| 7,834,074 | B2 | 11/2010 | Brunelet et al. ............. 524/318 |
| 7,882,874 | B2 | 2/2011 | Robert et al. .............. 152/209.1 |
| 7,900,667 | B2 | 3/2011 | Vasseur ..................... 152/209.1 |
| 8,039,565 | B2 | 10/2011 | Boisson et al. .............. 526/164 |
| 8,071,700 | B2 | 12/2011 | Thuilliez et al. ............. 526/164 |
| 8,071,800 | B2 | 12/2011 | Thuilliez et al. ................ 556/7 |
| 8,268,949 | B2 | 9/2012 | Thuilliez et al. ............. 526/339 |
| 8,324,310 | B2 | 12/2012 | Robert et al. ................ 524/518 |
| 8,461,269 | B2 | 6/2013 | Varagniat et al. ............ 525/209 |
| 8,492,573 | B2 | 7/2013 | Thuilliez et al. .............. 556/11 |
| 8,962,743 | B2 | 2/2015 | Kaita et al. |
| 2003/0004287 | A1 | 1/2003 | Barbotin et al. ............. 526/127 |
| 2003/0212185 | A1 | 11/2003 | Vasseur ....................... 524/492 |
| 2005/0239639 | A1 | 10/2005 | Monteil et al. .............. 502/117 |
| 2006/0160969 | A1 | 7/2006 | Boisson et al. .............. 526/164 |
| 2007/0112120 | A1 | 5/2007 | Vasseur ....................... 524/492 |
| 2008/0009564 | A1 | 1/2008 | Robert et al. ................ 523/351 |
| 2008/0132644 | A1 | 6/2008 | Lapra et al. ................. 525/105 |
| 2008/0156404 | A1 | 7/2008 | Brunelet et al. ........... 152/209.1 |
| 2009/0182104 | A1 | 7/2009 | Thuilliez et al. ............. 526/126 |
| 2009/0270558 | A1 | 10/2009 | Gandon-pain et al. ....... 525/190 |
| 2009/0270578 | A1 | 10/2009 | Boisson et al. .............. 526/339 |
| 2009/0292063 | A1 | 11/2009 | Robert et al. ................ 524/518 |
| 2010/0022714 | A1 | 1/2010 | Varagniat et al. ............ 525/209 |
| 2010/0022725 | A1 | 1/2010 | Thuilliez et al. ............. 526/134 |
| 2010/0204359 | A1 | 8/2010 | Robert et al. ................ 523/157 |
| 2011/0021702 | A1 | 1/2011 | Gandon-Pain et al. ........ 525/55 |
| 2012/0142905 | A1 | 6/2012 | Thuilliez et al. ............... 534/15 |
| 2012/0165492 | A1 | 6/2012 | Thuilliez et al. ............. 526/339 |
| 2012/0208948 | A1 | 8/2012 | Gandon-Pain et al. ...... 524/521 |

(Continued)

FOREIGN PATENT DOCUMENTS

| EP | 1 092 731 A1 | 4/2001 |
| EP | 1 829 901 A2 | 9/2007 |
| WO | 96/37547 A2 | 11/1996 |
| WO | 99/28380 A1 | 6/1999 |
| WO | 02/10269 A2 | 2/2002 |
| WO | 2005/087859 A1 | 9/2005 |
| WO | 2006/061064 A1 | 6/2006 |
| WO | 2006/069792 A1 | 7/2006 |

(Continued)

OTHER PUBLICATIONS

International Search Report dated Feb. 28, 2014, issued by EPO in connection with International Application No. PCT/EP2014/051068.

(Continued)

*Primary Examiner* — Peter D Mulcahy
(74) *Attorney, Agent, or Firm* — Venable LLP

(57) ABSTRACT

The present invention relates to a rubber composition based on a reinforcing filler and on an elastomer matrix comprising a highly saturated diene elastomer comprising at least five distinct units of A, B, C, D and E distributed randomly within the elastomer at respective molar fractions of m %, n %, o %, p % and q %, where m+n+o+p+q=100; m≥50; n+o+p+q≥10; and 15≥p+q≥2.
This rubber composition enables a satisfactory degree of stiffness to be reached while maintaining hysteresis properties acceptable for use in the manufacture of tires for running vehicles.

19 Claims, No Drawings

(56) References Cited

U.S. PATENT DOCUMENTS

2013/0324660 A1* 12/2013 Matsushita et al. ...... B60C 1/00 524/526
2014/0031503 A1 1/2014 Qin et al. ...................... 526/126

FOREIGN PATENT DOCUMENTS

| WO | 2006/069793 A1 | 7/2006 |
| WO | 2007/017060 A1 | 2/2007 |
| WO | 2008/003434 A1 | 1/2008 |
| WO | 2008/003435 A1 | 1/2008 |
| WO | 2012/014463 A1 | 2/2012 |
| WO | 2012/106694 A2 | 8/2012 |

OTHER PUBLICATIONS

Office Action dated Sep. 4, 2017, in counterpart JP 2015-554121 (6 pages).

* cited by examiner

RUBBER COMPOSITION COMPRISING A HIGHLY SATURATED DIENE ELASTOMER

FIELD OF THE INVENTION

The present invention relates to a reinforced rubber composition based on an elastomer matrix comprising a highly saturated diene elastomer, and also to a semi-finished article comprising such a composition and to a tyre incorporating such a semi-finished article.

STATE OF THE ART

Now that savings in fuel and the need to protect the environment have become a priority, it is desirable to produce mixtures having good wear resistance properties while having a hysteresis which is as low as possible in order to be able to process them in the form of rubber compositions which can be used in the manufacture of various semi-finished products participating in the composition of tyres, such as for example treads, in order to obtain tyres having an improved wear resistance without adversely affecting the rolling resistance.

Ideally, for example, a tyre tread must fulfil a great many technical requirements, which are often contradictory in nature, including increased wear resistance while affording the tyre low rolling resistance and enhanced grip, both on dry ground and on wet, snowy or icy ground.

It is known that to improve wear resistance a certain stiffness of the tread is desirable, which stiffening of the tread may be obtained for example by increasing the content of reinforcing filler or by incorporating certain reinforcing resins into the rubber compositions making up these treads.

Unfortunately, experience shows that such stiffening of the tread adversely affects the rolling resistance properties, in a known way and often prohibitively so, since it is accompanied by significantly increased hysteresis losses of the rubber composition. Consequently, improving the stiffness performance while maintaining low rolling resistance is a constant concern of tyre designers.

There is therefore a permanent need to provide a rubber composition which enables tyres with improved wear resistance to be obtained without adversely affecting the rolling resistance.

In light of the above, it is a general aim to provide rubber compositions for tyres which allow a compromise to be reached between the stiffness and hysteresis properties that is acceptable for use in tyres.

BRIEF DESCRIPTION OF THE INVENTION

This aim is achieved in that the inventors have developed a rubber composition for tyres which enables a satisfactory degree of stiffness to be reached while maintaining acceptable hysteresis properties.

Thus, a subject-matter of the invention is a rubber composition for tyres comprising a reinforcing filler and a highly saturated elastomer, which allows the targeted compromise in properties to be achieved.

Another subject-matter of the invention is a process for preparing such a rubber composition for tyres.

Another subject-matter of the invention is a semi-finished article comprising such a rubber composition.

A subject-matter of the invention is also a tyre incorporating such a semi-finished article.

DETAILED DESCRIPTION OF THE INVENTION

In the present description, unless expressly indicated otherwise, all the percentages (%) given are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

A first subject-matter of the invention is a rubber composition based on a reinforcing filler and on an elastomer matrix comprising at least one highly saturated diene elastomer, characterized in that the highly saturated elastomer comprises at least the following units, distributed randomly within the elastomer:

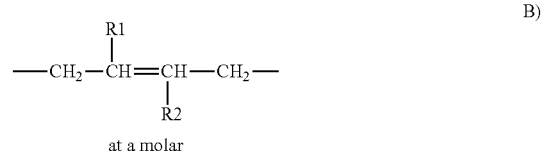

where R1 and R2, which are identical or different, denote a hydrogen atom, a methyl radical or a phenyl radical which is substituted or unsubstituted in the ortho, meta or para position by a methyl radical; preferably, R1 and R2, which are identical or different, denote a hydrogen atom or a methyl radical; more preferably, R1 and R2 both denote a hydrogen atom,

the unit D forming a divalent hydrocarbon-based ring with 6 carbon atoms, of 1,2-cyclohexane type,

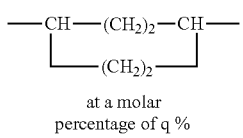

at a molar percentage of q % the unit E forming a divalent hydrocarbon-based ring with 6 carbon atoms, of 1,4-cyclohexane type,
with m, n, o, p and q being numbers ranging from 0 to 100;

and in that the highly saturated elastomer has the following features:
$m+n+o+p+q=100$
$m \geq 50$
$n+o+p+q \geq 10$
$15 \geq p+q \geq 2$ Preferably, the molar ratios of each of the units of the highly saturated elastomer fulfil at least one of the following criteria, and more preferably all of them:
$m \geq 65$
$n+o+p+q \geq 15$, more preferably 20
$10 \geq p+q \geq 2$
$1 \geq n/(o+p+q)$
when q is not zero, $20 \geq p/q \geq 1$ According to a variant of the invention, the highly saturated elastomer consists solely of units chosen from the categories A, B, C, D and E at their respective molar contents.

According to another variant of the invention, the highly saturated elastomer comprises, in addition to the units chosen from the categories A, B, C, D and E, units of category F at a molar content, denoted r %, of less than 25%, particularly of less than 10%, in relation to the whole of the elastomer:

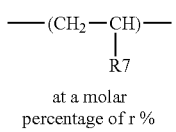

at a molar percentage of r % with R7 denoting an alkyl radical having from 1 to 4 carbon atoms, or an aryl radical, and with the condition that $m+n+o+p+q+r=100$.

According to these two variants, one particular embodiment of the invention provides for the highly saturated elastomer to be such that R1 and R2 are identical and denote a hydrogen atom.

It is understood that this highly saturated diene elastomer may consist of a mixture of highly saturated diene elastomers which differ from one another in terms of their microstructures or their macrostructures.

According to the invention, the highly saturated diene elastomer has a number-average molar mass ($M_n$) of at least 60 000 g/mol and of at most 1 500 000 g/mol. The polydispersity index PDI, equal to $M_w/M_n$ ($M_w$ being the weight-average molar mass), is between 1.20 and 3.00.

The highly saturated elastomer may be obtained according to various synthesis methods known to those skilled in the art, notably as a function of the targeted values of m, n, o, p, q and r. Generally, the highly saturated elastomer may be prepared by copolymerization of at least one conjugated diene monomer and ethylene, according to known synthesis methods. In this connection, mention may be made of the metallocene complexes described in documents EP 1 092 731 A1, EP 1 554 321 A1, EP 1 656 400 A1, EP 1 829 901 A1, EP 1 954 705 A1 and EP 1 957 506 A1, in the name of the Applicant Companies.

A conjugated diene having from 4 to 12 carbon atoms is notably suitable as conjugated diene monomer. Mention may be made of 1,3-butadiene, 2-methyl-1,3-butadiene, 2,3-dimethyl-1,3-butadiene, an aryl-1,3-butadiene or 1,3-pentadiene. According to a preferred aspect, the diene monomer is 1,3-butadiene or 2-methyl-1,3-butadiene, more preferably 1,3-butadiene.

Thus, according to some of these synthesis methods, the highly saturated elastomer may be obtained by copolymerization of at least one conjugated diene monomer and ethylene, in the presence of a catalytic system comprising a lanthanide metallocene complex with ansa ligands of fluorenyl type. In this connection, mention may be made of the metallocene complexes described in documents EP 1 092 731 A1, EP 1 554 321 A1 and EP 1 954 705 A1.

According to the variant of the invention introducing the unit F into the polymer chain, the highly saturated elastomer may be obtained by copolymerization of at least one conjugated diene monomer and two olefins, such as ethylene and an α-olefin, in the presence of a catalytic system comprising a lanthanide metallocene complex with ligands of ansa cyclopentadienyl-fluorenyl type. One variant further consists in using a styrene derivative as termonomer, associated with at least one conjugated diene monomer and ethylene. In this connection, mention may be made of the metallocene complexes described in documents EP 1 092 731 A1, EP 1 656 400 A1, EP 1 829 901 A1 and EP 1 957 506 A1, in the name of the Applicant Companies.

For example, an α-olefin having from 3 to 18 carbon atoms, advantageously having from 3 to 6 carbon atoms, is suitable as α-olefin monomer. Mention may be made of propylene, butene, pentene, hexene or a mixture of these compounds.

According to one or more variants for the synthesis of the highly saturated elastomer, the latter is prepared in accordance with the abovementioned documents, by adapting the polymerization conditions using means known to those skilled in the art so as to achieve number-average molar mass ($M_n$) values of at least 60 000 g/mol. By way of illustration, the polymerization time may be significantly increased so that the monomer conversion is greater, thereby leading to molar masses of at least 60 000 g/mol being obtained. By way of illustration, during the preparation of the catalytic systems according to the abovementioned documents, the stoichiometry of the alkylating agent relative to the metallocene complex(es) is reduced, so as to reduce chain transfer reactions and to allow molar masses of at least 60 000 g/mol to be obtained.

The rubber composition which is a subject-matter of the invention comprises, according to one variant, the highly saturated diene elastomer as sole constituent of the elastomer matrix.

According to another variant, the elastomer matrix of the rubber composition in accordance with the invention may also comprise at least one other diene elastomer different from the highly saturated diene elastomer. According to this variant, this other elastomer is present in proportions of at most 60 phr (parts by weight per hundred parts of total elastomer), preferably of at most 45 phr. Moreover, this elastomer is preferably present in proportions of at least 5 phr.

According to this variant, this other diene elastomer may be any homopolymer obtained by polymerization of a conjugated diene monomer having from 4 to 12 carbon atoms, or any copolymer obtained by copolymerization of one or more conjugated dienes with one another or with one or more vinylaromatic compounds having from 8 to 20 carbon atoms. In the latter case, the copolymer contains from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

This other diene elastomer may have any microstructure. It may be a block, random, sequential or microsequential elastomer, and may be prepared in emulsion or in solution. It may be coupled and/or star-branched, or else functionalized with a coupling and/or star-branching or functionalizing agent.

Preferably, this other diene elastomer used in the invention is selected from the group of highly unsaturated diene elastomers (i.e. comprising at least 50% by weight of units of diene origin) consisting of polybutadienes (BRs), synthetic polyisoprenes (IRs), natural rubber (NR), butadiene copolymers and isoprene copolymers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

It is understood that this other diene elastomer may be formed by a mixture of diene elastomers that differ from one another in their microstructure, in their macrostructure or in the presence of a function, in the nature or the position of the latter on the elastomer chain.

The rubber composition in accordance with the invention has the other essential feature of comprising a reinforcing filler, for example carbon black, an inorganic reinforcing filler such as silica, with which a coupling agent is combined in a known way, or else a mixture of these two types of filler.

According to a variant of the invention, the reinforcing filler predominantly comprises carbon black, i.e. it comprises at least 50% carbon black by weight of the total weight of the filler.

According to this variant, the reinforcing filler may consist of 100% by weight of carbon black. If the reinforcing filler comprises less than 100% by weight of carbon black, the filler remainder is provided by at least one other reinforcing filler, notably silica.

According to another variant of the invention, the reinforcing filler is predominantly other than carbon black, i.e. it comprises more than 50% by weight, of the total weight of the filler, of one or more fillers other than carbon black, notably an inorganic reinforcing filler such as silica; indeed even it exclusively consists of such a filler.

According to this other variant, when carbon black is also present, it may be used at an amount of lower than 20 phr, more preferably lower than 10 phr (for example between 0.5 and 20 phr, notably between 2 and 10 phr). In the ranges indicated, benefit is gained from the colouring (black pigmenting agent) and UV-stabilizing properties of carbon blacks.

Preferably, the amount of total reinforcing filler (carbon black and/or other reinforcing filler such as silica) is between 10 and 200 phr, more preferably between 30 and 150 phr, the optimum being, in a known way, different according to the specific applications targeted.

All carbon blacks, used individually or in the form of mixtures, are suitable as carbon blacks, notably the blacks conventionally used in tyres or their treads ("tyre-grade" blacks). Among the latter, mention will more particularly be made of the reinforcing carbon blacks of the series 100, 200, 300, or the blacks of the series 500, 600 or 700 (ASTM grades), such as for example the blacks N115, N134, N234, N326, N330, N339, N347, N375, N550, N683, N772. These carbon blacks can be used in the isolated state, as available commercially, or in any other form, for example as carrier for some of the rubber additives used.

Any other inorganic or mineral filler, irrespective of its colour and origin (natural or synthetic), which is able to reinforce on its own, with no means other than an intermediate coupling agent, a rubber composition intended for manufacturing tyres is to be understood here as inorganic reinforcing filler other than carbon black; such a filler is generally characterized, in a known way, by the presence of hydroxyl groups (—OH) at its surface.

Such inorganic reinforcing fillers are notably mineral fillers of the siliceous type, preferably silica ($SiO_2$). The silica used can be any reinforcing silica known to those skilled in the art, notably any precipitated or fumed silica exhibiting a BET specific surface and a CTAB specific surface both of less than 450 $m^2/g$, preferably from 30 to 400 $m^2/g$, notably between 60 and 300 $m^2/g$. Mention will also be made of mineral fillers of the aluminous type, in particular alumina ($Al_2O_3$) or aluminium (oxide) hydroxides, or else reinforcing titanium oxides, for example described in U.S. Pat. No. 6,610,261 and U.S. Pat. No. 6,747,087. As reinforcing fillers, reinforcing fillers of another nature, notably carbon black, are also suitable, as long as these reinforcing fillers are covered with a siliceous layer, or else have functional sites, notably hydroxyl sites, at the surface thereof, entailing the use of a coupling agent in order to establish the bond between the filler and the elastomer. By way of example, mention may be made, for example, of carbon blacks for tyres, such as described, for example, in patent documents WO 96/37547 and WO 99/28380.

The physical state under which the inorganic reinforcing filler is present is of no importance, whether it is in the form of powder, microbeads, granules or else beads. Of course, mixtures of different reinforcing fillers, in particular of highly dispersible silicas as described above, are also understood by inorganic reinforcing filler.

When the reinforcing filler comprises a filler which entails the use of a coupling agent in order to establish the bond between the filler and the elastomer, the rubber composition according to the invention also conventionally comprises an agent able to effectively ensure this bond. When silica is present in the composition as reinforcing filler, organosilanes, notably alkoxysilane polysulphides or mercaptosilanes, or else at least bifunctional polyorganosiloxanes, may be used as coupling agents. Silica/elastomer bonding agents notably have been described in a great many documents, with the most well known being bifunctional alkoxysilanes such as alkoxysilane polysulphides.

In the compositions in accordance with the invention, the amount of coupling agent is advantageously lower than 20 phr, it being understood that it is generally desirable to use as little as possible thereof. The amount thereof is preferably between 0.5 and 12 phr. The presence of the coupling agent depends on the presence of the inorganic reinforcing filler other than carbon black. The amount thereof is readily adjusted by those skilled in the art depending on the amount of this filler; it is typically of the order of 0.5% to 15% by weight relative to the amount of inorganic reinforcing filler other than carbon black.

The rubber compositions in accordance with the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention may also contain organic reinforcing fillers which may replace all or part of the carbon blacks or of the other inorganic reinforcing fillers described above. As examples of organic reinforcing fillers, mention may be made of functionalized polyvinyl organic fillers as described in applications WO-A-2006/069792, WO-A-2006/069793, WO-A-2008/003434 and WO-A-2008/003435.

The rubber compositions in accordance with the invention may also comprise all or some of the normal additives customarily used in elastomer compositions intended for the manufacture of tyres, such as for example pigments, protection agents such as anti-ozone waxes, chemical antiozonants or antioxidants, antifatigue agents, reinforcing or plasticizing resins, methylene acceptors (for example phenol novolac resin) or methylene donors (for example HMT or H3M) as described for example in application WO 02/10269, a crosslinking system based either on sulphur or on sulphur donors and/or on peroxide and/or on bismaleimides, vulcanization accelerators, vulcanization activators, adhesion promoters such as cobalt-based compounds, plasticizing agents, preferably non-aromatic or very slightly aromatic, selected from the group consisting of naphthenic oils, paraffinic oils, MES oils, TDAE oils, ether plasticizers, ester plasticizers, hydrocarbon-based resins having a high Tg, preferably of greater than 30° C., as described for example in applications WO 2005/087859, WO 2006/061064 and WO 2007/017060, and mixtures of such compounds.

A subject-matter of the invention is also a process for preparing a rubber composition as described previously.

The composition is manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process in accordance with the invention for preparing a rubber composition according to the invention comprises at least the following steps:

carrying out, at a maximum temperature of between 130° C. and 200° C., preferably between 145° C. and 185° C., a first step of thermomechanical working (sometimes termed a "non-productive" phase) of the base constituents needed for the rubber composition, with the exception of the crosslinking system and if applicable an adhesion promoter, by intimately incorporating, by kneading in one or more stages, composition ingredients into the elastomer matrix comprising the highly saturated elastomer, then carrying out, at a temperature lower than the said maximum temperature of the said first step, preferably lower than 120° C., a second step of mechanical working during which the said crosslinking system and if applicable an adhesion promoter are incorporated.

According to variants of the invention, the process for preparing the rubber composition comprises the step of preparing the highly saturated elastomer as described above according to the various synthesis methods thereof.

The finished composition thus obtained can then be calendered, for example in the form of a sheet or a plaque or else can be extruded, for example so as to form a rubber profiled element which can be used as a semi-finished rubber product intended for the tyre.

Another subject-matter of the invention is a semi-finished rubber product comprising a reinforced rubber composition according to the invention.

Another subject-matter of the invention is a tyre, at least one of the constituent elements of which is a semi-finished rubber product comprising a reinforced rubber composition according to the invention.

By virtue of the improved stiffness which characterizes a reinforced rubber composition according to the invention, without deterioration of the hysteresis properties, it will be noted that a tyre, the tread of which comprises the composition, has advantageous wear resistance without adversely affecting the rolling resistance.

The aforementioned features of the present invention, as well as others, will be better understood on reading the following description of several exemplary embodiments of the invention, given by way of non-limiting illustration.

Measurements and Tests Used

The rubber compositions are characterized after curing, as indicated below.

a) Mechanical Properties

Tensile Tests

These tensile tests make it possible to determine the elasticity stresses and the properties at break. Unless otherwise indicated, they are carried out in accordance with French Standard NF T 46-002 of September 1988. At second elongation (i.e. after an accommodation cycle at the extension rate provided for the measurement itself), the nominal secant modulus (or apparent stress, in MPa) is measured at 10% elongation (denoted by EM10) and 100% elongation (denoted by EM100). The tensile measurements for determining the secant accommodated moduli are carried out at a temperature of 60° C.+/−2° C. and under standard hygrometry conditions (50+/−5% relative humidity).

b) Dynamic Properties

The dynamic properties G* and tan(δ)max, representative of the hysteresis, are measured on a viscosity analyser (Metravib VA4000), according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded under standard temperature conditions (23° C.) according to Standard ASTM D 1349-99 or, as the case may be, at a different temperature; in particular, in the examples cited, the measurement temperature is 60° C. A peak-to-peak strain amplitude sweep is carried out from 0.1% to 100% (outward cycle) and then from 100% to 0.1% (return cycle). The results made use of are the complex dynamic shear modulus (G*) and the loss factor tan(δ). For the return cycle, the maximum value of tan(δ) observed, denoted tan(δ)max, is indicated.

EXAMPLES

The tests which follow demonstrate the improved stiffness of a rubber composition according to the invention, while maintaining the same degree of hysteresis and hence of rolling resistance, or even while improving hysteresis by lowering the value thereof, in comparison to control compositions. The compositions tested, for which the reinforcing filler is carbon black, may very particularly constitute a tread.

Elastomer 1 is an SBR made up in the following way: 15% styrene units, 20% 1,2-butadiene units and 65% 1,4-butadiene units (Tg=−49° C.).

Elastomer 2 is natural rubber.

Elastomer A is an EBR (ethylene/butadiene rubber) with 68 mol % ethylene units obtained by copolymerization of ethylene and butadiene, according to a polymerization method in accordance with Example 4-2 of patent application EP 1 954 705 B1 in the name of the Applicant Companies. The polymerization time was adjusted so as to obtain a molar mass $M_n$=170 000 g/mol with a polydispersity index equal to 1.8.

Elastomer B is an EBR (ethylene/butadiene rubber) with 68 mol % ethylene units obtained by copolymerization of ethylene and butadiene, according to a polymerization method in accordance with Example 7-2 of patent application EP 1 954 705 B1 in the name of the Applicant Companies. The polymerization time was increased so as to obtain higher molar masses $M_n$ equal to 164 000 g/mol without significantly altering the other features of the EBR.

The features of the elastomers are summed up in Table 1.

TABLE 1

| Elastomer | 1 | A | B |
|---|---|---|---|
| Double bond (mol %) | 85 | 24 | 24 |
| 1,2-Cyclohexyl intrachain ring (mol %) | — | 8 | 6 |
| 1,4-Cyclohexyl intrachain ring (mol %) | — | — | 2 |
| 1,2 (mol %) | 20 | 15 | 18 |
| 1,4 (mol %) | 65 | 9 | 6 |
| $CH_2$—$CH_2$ ethylene unit (mol %) | — | 68 | 68 |

The Compositions

Six compositions given in Table 2 below are compared. Three of said compositions are not in accordance with the formulation proposed by the invention:
Composition C1: control with unsaturated diene elastomer,
Composition C2: control with unsaturated diene elastomer, stiffened by increasing the amount of filler,
Composition C3: control with a blend of unsaturated diene elastomers.

Compositions M1 and M2 are in accordance with the invention and are based on the highly saturated diene elastomer denoted A.

Composition N is in accordance with the invention and is based on the highly saturated diene elastomer denoted B.

The tests below are carried out in the following manner:

The diene elastomer(s), the reinforcing fillers (silica and carbon black) and also the various other ingredients, with the exception of the vulcanization system, are successively introduced into an internal mixer (final fill ratio: approximately 70% by volume), the initial vessel temperature of which is approximately 80° C.

Thermomechanical working (non-productive phase) is then carried out in one step, which lasts in total approximately 3 to 4 min, until a maximum "dropping" temperature of 165° C. is reached. The mixture thus obtained is recovered and cooled and then sulphur and an accelerator of sulphamide type are incorporated on a mixer (homofinisher) at 30° C., everything being mixed (productive phase) for a suitable time (for example around ten minutes).

The compositions thus obtained are subsequently calendered either in the form of plaques (2 to 3 mm thickness) or thin sheets of rubber in order to measure the physical or mechanical properties thereof.

The compositions tested are given in detail in Table 2 below:

TABLE 2

| Composition | C1 | C2 | C3 | M1 | M2 | N |
|---|---|---|---|---|---|---|
| Unsaturated diene 1 (1) | 100 | 100 | 60 | | | |
| Unsaturated diene 2 (2) | | | 40 | 40 | 20 | 40 |
| Highly saturated diene (3) | | | | 60 (A) | 80 (A) | 60 (B) |
| Filler (4) | 47.5 | 54 | 47.5 | 47.5 | 47.5 | 47.5 |
| Resin (5) | 0.5 | 0.5 | 0.5 | 0.5 | 0.5 | 0.5 |
| Paraffin 6266 | 1 | 1 | 1 | 1 | 1 | 1 |
| 6PPD | 2 | 2 | 2 | 2 | 2 | 2 |
| TMQ (6) | 1 | 1 | 1 | 1 | 1 | 1 |
| ZnO | 3 | 3 | 3 | 3 | 3 | 3 |
| Stearic acid | 2.5 | 2.5 | 2.5 | 2.5 | 2.5 | 2.5 |
| CBS (7) | 0.6 | 0.6 | 0.6 | 0.6 | 0.6 | 0.6 |
| HMT3H (8) | 0.6 | 0.6 | 0.6 | 0.6 | 0.6 | 0.6 |
| Sulphur | 1.5 | 1.5 | 1.5 | 1.5 | 1.5 | 1.5 |

(1) Unsaturated elastomer 1 described above
(2) Natural rubber
(3) Highly saturated elastomer prepared above
(4) Carbon black N347
(5) Phenol/formaldehyde resin
(6) 2,2,4-Trimethyl-1,2-dihydroquinoline
(7) N-Cyclohexyl-2-benzothiazolesulphenamide
(8) Hexamethylenetetramine Results The properties of the compositions are given in Table 3 below.

TABLE 3

| Composition | C1 | C2 | C3 | M1 | M2 | N |
|---|---|---|---|---|---|---|
| tan(δ)max (60° C., 10 Hz) | 0.19 | 0.22 | 0.19 | 0.17 | 0.16 | 0.17 |
| G* (MPa) (60° C., 10 Hz, 10%) | 2.0 | 2.4 | 2.1 | 2.2 | 2.4 | 2.4 |
| G* (MPa) | 1.6 | 1.8 | 1.6 | 1.8 | 1.8 | 2.0 |

TABLE 3-continued

| Composition | C1 | C2 | C3 | M1 | M2 | N |
|---|---|---|---|---|---|---|
| (60° C., 10 Hz, 50%) | | | | | | |
| EM10 | 5.5 | 6.3 | 5.5 | 7.4 | 7.6 | 7.7 |
| EM100 | 2.1 | 2.5 | 2.3 | 3.0 | 3.2 | 3.6 |

It is noted that the stiffness at low and moderate strains of the compositions in accordance with the invention is greater than that of control compositions C1 and C3, and of the same order as that of control composition C2 which has a greater amount of filler than control composition C1 with the aim of improving the stiffness. It is clearly observed that this increase in the amount of filler has an adverse effect on the hysteresis properties of control composition C2 in the light of control composition C1.

This improvement in the mechanical properties is favourable in terms of wear resistance of a tyre equipped with a tread made of such a composition.

Despite this improvement in stiffness, the composition in accordance with the invention has significantly improved hysteresis properties compared to those of control compositions C1 and C3, contrary to what is observed for control composition C2 compared to compositions C1 and C3.

This is favourable for reducing the rolling resistance of a tyre equipped with a tread made of such a composition.

In conclusion, the results of these tests show that the use of a highly saturated diene elastomer according to the invention affords a notable improvement in the stiffness of the rubber compositions according to the invention, and hence an improvement in the wear resistance of tyres containing the said compositions, while reducing the hysteresis of the compositions and hence the rolling resistance of the tyres compared to a conventional tyre.

The invention claimed is:

1. A rubber composition comprising a reinforcing filler and an elastomer matrix comprising a highly saturated diene elastomer,
wherein the highly saturated diene elastomer comprises at least units of A, B, C, D and E, distributed randomly within the highly saturated diene elastomer:

—CH$_2$—CH$_2$—     at a molar fraction of m %,     (A)

—CH$_2$—R1C=CR2—CH$_2$—     at a molar fraction of n %,     (B)

(C)
—CH$_2$—C(R1)(R2—C(=CH$_2$))—     at a molar fraction of o %, (D)
—CH—CH—     at a molar percentage of p %,
 |   |
 (CH$_2$)$_4$ (E)
—CH—(CH$_2$)$_2$—CH—     at a molar percentage of q %,
 |___(CH$_2$)$_2$___| wherein R1 and R2, which are identical or different, represent a hydrogen atom, a methyl radical or a phenyl radical, which is substituted or unsubstituted in the ortho, meta or para position by a methyl radical,
wherein (D) is a divalent hydrocarbon-based ring with 6 carbon atoms of 1,2-cyclohexane type,
wherein (E) is a divalent hydrocarbon-based ring with 6 carbon atoms of 1,4-cyclohexane type,
wherein m, n, o, p and q are numbers ranging from 0 to 100, and
wherein the highly saturated diene elastomer satisfies the following:
m+n+o+p+q=100,
m≤50,
n+o+p+q≤10, and
15≤p+q≤2.

2. The rubber composition according to claim 1, wherein the highly saturated diene elastomer further comprises units of (F)

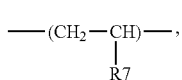

(F)
—(CH$_2$—CH)—,
      |
      R7
at a molar percentage of r % wherein R7 is an alkyl radical having from 1 to 4 carbon atoms or an aryl radical, and
wherein the highly saturated diene elastomer satisfies the following:
m+n+o+p+q+r=100, and
25≥r≥0.

3. The rubber composition according to claim 1, wherein R1 and R2 are each a hydrogen atom.

4. The rubber composition according to claim 1, wherein the highly saturated diene elastomer satisfies as least one of the following:
m≥65,
n+o+p+q≥15,
10≤p+q≤2,
1≤n/(o+p+q), and
when q is not zero, 20≤p/q≤1.

5. The rubber composition according to claim 4, wherein the highly saturated diene elastomer fulfils all of the following:
m≤65,
n+o+p+q≥15,
10≤p+q≤2,
1≤n/(o+p+q), and
when q is not zero, 20≤p/q≤1.

6. The rubber composition according to claim 4, wherein n+o+p+q≤20.

7. The rubber composition according to claim 1, wherein the elastomer matrix consists solely of the highly saturated diene elastomer.

8. The rubber composition according to claim 1, wherein the elastomer matrix comprises at least 40 phr of the highly saturated diene elastomer and at most 60 phr of at least one other diene elastomer.

9. The rubber composition according to claim 1, wherein the reinforcing filler comprises carbon black.

10. The rubber composition according to claim 9, wherein the reinforcing filler consists of 100% of carbon black.

11. The rubber composition according to claim 1, wherein the reinforcing filler comprises an inorganic reinforcing filler other than carbon black.

12. The rubber composition according to claim 11, wherein the reinforcing filler comprises silica.

13. A process for preparing a rubber composition according to claim 1, said process comprising the steps of:
(a) thermomechanically working, by kneading in one or more stages, to incorporate base constituents of the rubber composition into the elastomer matrix comprising the highly saturated diene elastomer at a maximum temperature of between 130° C. and 200° C.,
wherein the base constituents do not include a crosslinking system or an adhesion promoter, if present; and then
(b) mechanically working to incorporate the crosslinking system and the adhesion promoter, if present, at a temperature lower than said maximum temperature of step (a).

14. The process according to claim 13, wherein the maximum temperature for step (a) is between 145° C. and 185° C.

15. The process according to claim 13, wherein the maximum temperature for step (b) is lower than 120° C.

16. The process according to claim 13 further comprising the step of preparing the highly saturated diene elastomer.

17. A semi-finished article comprising a rubber composition according to claim 1.

18. A tire incorporating a semi-finished article according to claim 17.

19. The tire according to claim 18, wherein the semi-finished article is a tread.

\* \* \* \* \*